(12) United States Patent
Lin

(10) Patent No.: US 12,412,028 B2
(45) Date of Patent: Sep. 9, 2025

(54) SPREADSHEET PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventor: Zihuan Lin, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/666,587

(22) Filed: May 16, 2024

(65) Prior Publication Data

US 2024/0303427 A1 Sep. 12, 2024

Related U.S. Application Data

(63) Continuation of application No. PCT/CN2022/132618, filed on Nov. 17, 2022.

(30) Foreign Application Priority Data

Nov. 17, 2021 (CN) .......................... 202111364825.8

(51) Int. Cl.
*G06F 40/18* (2020.01)
(52) U.S. Cl.
CPC .................... *G06F 40/18* (2020.01)
(58) Field of Classification Search
CPC ...................................................... G06F 40/18
See application file for complete search history.

(56) References Cited

U.S. PATENT DOCUMENTS 8,375,321 B2 2/2013 Cruz et al.
10,282,405 B1 5/2019 Silk et al.
(Continued)

FOREIGN PATENT DOCUMENTS

AU 2019100576 A4 6/2019
CN 1790325 A 6/2006
(Continued)

OTHER PUBLICATIONS

International Patent Application No. PCT/CN2022/132618; Int'l Search Report and Written Opinion; dated Jan. 28, 2023; 7 pages.
(Continued)

*Primary Examiner* — Daniel Samwel
(74) *Attorney, Agent, or Firm* — BakerHostetler

(57) ABSTRACT

The present disclosure relates to a spreadsheet processing method and apparatus, an electronic device, and a storage medium. The method according to an embodiment of the present disclosure includes: determining a target cell; displaying a data editing interface in response to a first operation; determining an option data set based on a second operation on the data editing interface, where the option data set includes N items of option data, and N is a positive integer; determining M cell color schemes based on the N items of option data in response to a first control displayed in the data editing interface being triggered, M is a positive integer not greater than N; and associating the M cell color schemes with the N items of option data, so that each item of option data is capable of being displayed in the target cell according to an associated cell color scheme.

17 Claims, 5 Drawing Sheets

(56) References Cited

U.S. PATENT DOCUMENTS

| | | | |
|---|---|---|---|
| 2002/0103825 A1* | 8/2002 | Bauchot | G06F 40/18 715/226 |
| 2006/0129914 A1* | 6/2006 | Ellis | G06F 3/04847 715/275 |
| 2006/0212469 A1* | 9/2006 | Babanov | G06F 40/18 707/999.102 |
| 2007/0101252 A1 | 5/2007 | Chamberlain et al. | |
| 2007/0204212 A1* | 8/2007 | Chamberlain | G06F 40/103 715/212 |
| 2008/0148140 A1* | 6/2008 | Nakano | G06F 40/18 715/215 |
| 2011/0066933 A1* | 3/2011 | Ludwig | G06F 40/103 715/212 |
| 2012/0192051 A1 | 7/2012 | Rothschiller et al. | |
| 2013/0111386 A1 | 5/2013 | Rhodes et al. | |
| 2013/0117714 A1 | 5/2013 | Rhee et al. | |
| 2016/0335241 A1* | 11/2016 | Teodorescu | G06F 21/6209 |
| 2017/0199861 A1* | 7/2017 | Zia | G06F 3/04842 |

FOREIGN PATENT DOCUMENTS

| | | |
|---|---|---|
| CN | 102314475 A | 1/2012 |
| CN | 102945162 A | 2/2013 |
| CN | 106569988 A | 4/2017 |
| CN | 108197114 A | 6/2018 |
| CN | 111291543 A | 6/2020 |
| CN | 111625314 A | 9/2020 |
| CN | 112329409 A | 2/2021 |
| CN | 113268964 A | 8/2021 |
| CN | 114185463 A | 3/2022 |
| CN | 114185463 B | 10/2023 |
| EP | 1999632 B1 | 11/2018 |
| JP | H 09-305354 A | 11/1997 |
| JP | 2000-268112 A | 9/2000 |
| JP | 2001-312686 A | 11/2001 |
| JP | 2013-178693 A | 9/2013 |
| JP | 2016-201061 A | 12/2016 |
| WO | WO 2007/030729 A2 | 3/2007 |

OTHER PUBLICATIONS

China Patent Application No. 202111364825.8; Notification to Grant; dated Sep. 13, 2023; 6 pages.
China Patent Application No. 202111364825.8; Office Action; dated Aug. 4, 2023; 32 pages.
European Patent Application No. 22894910.3; Extended European Search Report, dated Jan. 29, 2025, 9 pages.
Japanese Patent Application No. 2024-529505, Office Action dated Nov. 26, 2024, 5 pages with English translation.

* cited by examiner

SPREADSHEET PROCESSING METHOD AND APPARATUS, ELECTRONIC DEVICE, AND STORAGE MEDIUM

CROSS-REFERENCE TO RELATED APPLICATION

This application is a continuation of International Application No. PCT/CN2022/132618 filed on Nov. 17, 2022, which claims the priority to and benefits of Chinese Patent Application No. 202111364825.8, filed on Nov. 17, 2021. All the aforementioned patent applications are hereby incorporated by reference in their entireties.

TECHNICAL FIELD

The present disclosure relates to the field of computer technologies, and in particular, to a spreadsheet processing method and apparatus, an electronic device, and a storage medium.

BACKGROUND

In a spreadsheet, if a sequence validation function is set for a cell, only a value in a particular sequence can be entered in the cell as an option, where the sequence may be customized by a user, or may be referenced from a range of cells. In a related spreadsheet product, the sequence validation function cannot automatically add a color to an option. As a result, a display form is monotonous, and a meaning of content of the option cannot be better conveyed through the color.

SUMMARY

The Summary is provided to give a brief overview of concepts, which will be described in detail later in the section Detailed Description of Embodiments. The Summary is neither intended to identify key or necessary features of the claimed technical solutions, nor is it intended to be used to limit the scope of the claimed technical solutions.

In a first aspect, according to one or more embodiments of the present disclosure, there is provided a spreadsheet processing method, including:
determining a target cell;
displaying a data editing interface in response to a first operation;
determining an option data set based on a second operation on the data editing interface, where the option data set includes N items of option data, and N is a positive integer;
determining M cell color schemes based on the N items of option data in response to a first control displayed in the data editing interface being triggered, where M is a positive integer not greater than N; and
associating the M cell color schemes with the N items of option data, so that each item of option data is capable of being displayed in the target cell according to an associated cell color scheme.

In a second aspect, according to one or more embodiments of the present disclosure, there is provided a spreadsheet processing apparatus, including:
a cell determining unit configured to determine a target cell;
an interface display unit configured to display a data editing interface in response to a first operation;
an option data determining unit configured to determine an option data set based on a second operation on the data editing interface, where the option data set includes N items of option data, and N is a positive integer;
a color scheme determining unit configured to determine M cell color schemes based on the N items of option data in response to a first control displayed in the data editing interface being triggered, where M is a positive integer not greater than N; and
a color scheme association unit configured to associate the M cell color schemes with the N items of option data, so that each item of option data is capable of being displayed in the target cell according to an associated cell color scheme.

In a third aspect, according to one or more embodiments of the present disclosure, there is provided an electronic device, including: at least one memory and at least one processor, where the memory is configured to store program code, and the processor is configured to call the program code stored in the memory, to cause the electronic device to perform the spreadsheet processing method according to the one or more embodiments of the present disclosure.

In a fourth aspect, according to one or more embodiments of the present disclosure, there is provided a non-transitory computer storage medium, where the non-transitory computer storage medium stores program code that, when executed by a computer device, causes the computer device to perform the spreadsheet processing method according to the one or more embodiments of the present disclosure.

According to one or more embodiments of the present disclosure, the cell color schemes are determined based on the option data in response to the first control displayed in the data editing interface being triggered, and the determined cell color schemes are associated with the option data, such that each item of option data can be displayed in the target cell according to the associated cell color scheme. In this way, a meaning of content of the data is better conveyed through a color, and data discrimination is improved.

BRIEF DESCRIPTION OF DRAWINGS

The foregoing and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the drawings are schematic and that parts and elements are not necessarily drawn to scale.

DETAILED DESCRIPTION

Figure 1:
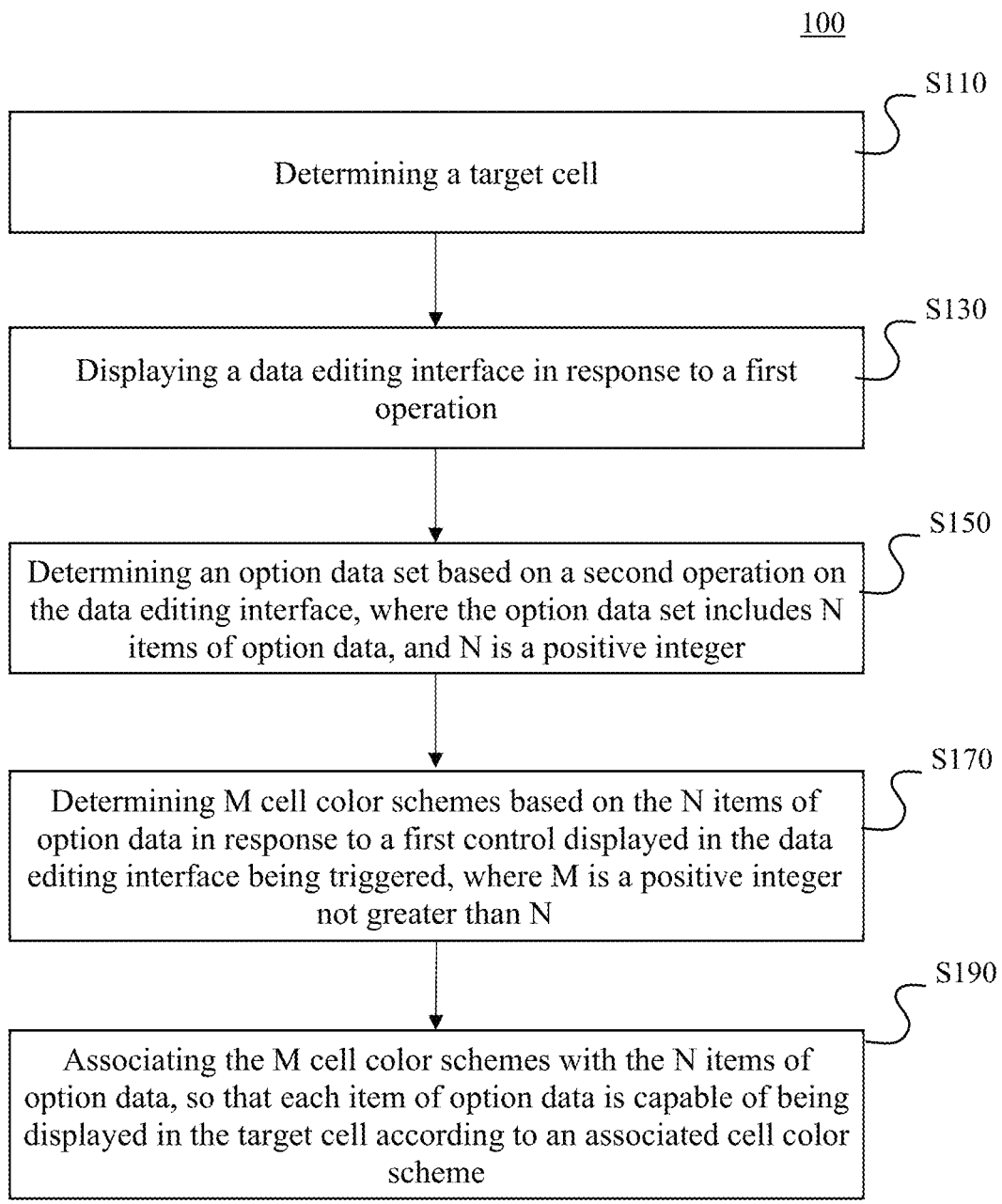
FIG. 1 is a flowchart of a spreadsheet processing method according to an embodiment of the present disclosure.

Embodiments of the present disclosure are described in more detail below with reference to the drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the drawings and the embodiments of the present disclosure are only for exemplary purposes, and are not intended to limit the scope of protection of the present disclosure.

It should be understood that the steps described in the implementations of the present disclosure may be performed in different orders, and/or performed in parallel. Furthermore, additional steps may be included and/or the execution of the illustrated steps may be omitted in the implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". The term "in response to" and a related term mean that a signal or event is affected by another signal or event to an extent, but is not necessarily fully or directly affected. If an event x occurs "in response to" an event y, x may respond directly or indirectly to y. For example, the occurrence of y may finally lead to the occurrence of x, but there may be other intermediate events and/or conditions. In other situations, the occurrence of y may not necessarily lead to the occurrence of x, that is, even if y has not occurred, x may occur. Moreover, the term "in response to" may also mean "at least partially in response to".

The term "determine" broadly encompasses a wide variety of actions, which may include obtaining, computing, calculating, processing, deriving, investigating, looking up (for example, looking up in a spreadsheet, a database, or other data structures), ascertaining, or similar actions, and may further include receiving (for example, receiving information), accessing (for example, accessing data in a memory), or similar actions, and parsing, selecting, choosing, establishing, and similar actions, and the like. Related definitions of the other terms will be given in the description below. Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

For the purpose of the present disclosure, the phrase "A and/or B" means (A), (B), or (A and B).

The names of messages or information exchanged between a plurality of apparatuses in the implementations of the present disclosure are used for illustrative purposes only, and are not used to limit the scope of these messages or information.

Referring to FIG. 1, FIG. 1 is a flowchart of a spreadsheet processing method 100 according to an embodiment of the present disclosure. The method 100 includes the following steps.

Step S110: determining a target cell.

The target cell may be a cell selected by a user, and may further include a cell having the same setting as the cell selected by the user. As an example, the user may select one or more target cells through an interactive operation such as a click and a drag and drop, or by entering an expression of the target cell.

Step S130: displaying a data editing interface in response to a first operation.

As an example, the first operation includes, but is not limited to, a touch operation, a click operation, a shortcut key operation, a gesture operation, a voice operation, and the like on a preset identifier.

It should be noted that the preset identifier may be in an interface where a spreadsheet is located, or may be set in a multi-level interface entered or opened through an interface where a spreadsheet is located, which is not limited here in the present disclosure.

Step S150: determining an option data set based on a second operation on the data editing interface, where the option data set includes N items of option data, and N is a positive integer.

The option data is used to be displayed in the determined target cell.

In some embodiments, in response to a select operation on at least one cell in the spreadsheet, a cell data set corresponding to the at least one cell may be referenced as the option data set. As an example, the select operation on the at least one cell in the spreadsheet may include entering a cell expression by the user, or a select operation on the cell in the spreadsheet.

As an example, a plurality of items of data respectively corresponding to a plurality of cells may be used as the cell data set. Alternatively, data in one cell may be split into a plurality of items of data based on a preset field, and then the plurality of items of data are used as the cell data set. For example, "A; B; C" displayed in one cell may be split into data "A", "B", and "C".

Step S170: determining M cell color schemes based on the N items of option data in response to a first control displayed in the data editing interface being triggered, where M is a positive integer not greater than N.

In some embodiments, the N items of option data may respectively correspond to different cell color schemes, and in this case, M is equal to N. Alternatively, a plurality of items of data in the N items of option data may share one cell color scheme, and in this case, M is less than N. It can be understood that the latter case may occur when a number of items of the option data exceeds a preset number of cell color schemes.

In some embodiments, a cell color scheme set may be preset, and each item of option data is assigned in sequence a cell color scheme correspondingly according to an arrangement order of cell color schemes in the cell color scheme set and an arrangement order of data in the option data set. If a number of items of option data in the option data set exceeds a number of the cell color schemes in the cell color scheme set, the excess option data may be reassigned a cell color scheme. In other words, the preset cell color scheme set may be reused.

In some embodiments, a plurality of cell color scheme sets may be preset, each corresponding to a different number of items of option data. As an example, if the option data set contains three items of option data, a cell color scheme set containing three cell color schemes may be selected.

In some embodiments, the cell color scheme includes a setting on a background color of a cell and/or a setting on a font color of the cell.

Step S190: associating the M cell color schemes with the N items of option data, so that each item of option data is capable of being displayed in the target cell according to an associated cell color scheme.

Figure 2:
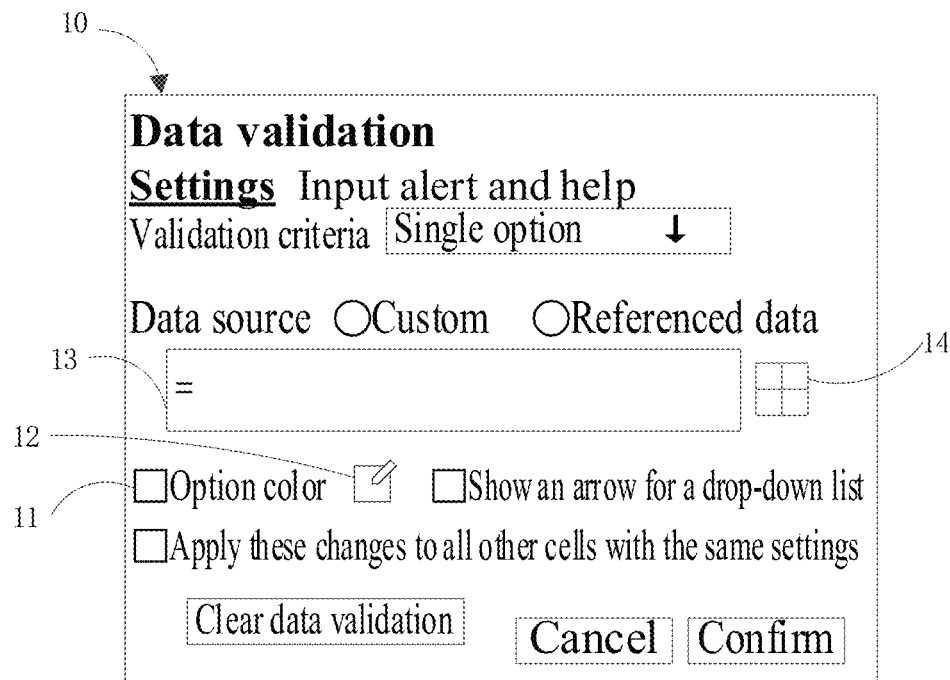
FIG. 2 is a schematic diagram of a data editing interface according to an embodiment of the present disclosure.

As an example, referring to FIG. 2, FIG. 2 is a schematic diagram of a data editing interface. A first control 11, a first input box 13, and a cell selection control 14 are displayed in a data editing interface 10.

The user may enter customized data in the first input box 13 as the option data set. Alternatively, the user may enter a cell expression in the first input box 13, or use the cell selection control 14 to select cell data existing in the spreadsheet, so that cell data corresponding to the cell expression or the selected cell data is referenced as the option data set.

In response to the first control 11 being selected, a system may determine the M cell color schemes based on the N items of option data. It can be understood that if the first control 11 is not selected, no cell color scheme may be determined.

According to one or more embodiments of the present disclosure, the cell color schemes are determined based on the option data in response to the first control displayed in the data editing interface being triggered, and the determined cell color schemes are associated with the option data, such that each item of option data can be displayed in the target cell according to the associated cell color scheme. In this way, a meaning of content of the data is better conveyed through a color, and data discrimination is improved.

In some embodiments, the method 100 further includes the following steps.

Step A1: displaying an option interface in response to a third operation of the user on the target cell, where in the option interface, the N items of option data are displayed according to the M cell color schemes.

As an example, the third operation includes, but is not limited to, a touch operation, a click operation, a shortcut key operation, a gesture operation, a voice operation, and the like on the preset identifier.

Step A2: filling the target cell with target option data in response to the user determining the target option data from the option interface, where the target option data is displayed in the target cell according to a cell color scheme associated with the target option data.

In this embodiment, once the option data is associated with the cell color schemes, the user may trigger display of the option interface through the third operation on the target cell. In the option interface, each item of option data is displayed according to the cell color scheme associated therewith. The user may select one or more items of the option data to fill the target cell.

Figure 3:
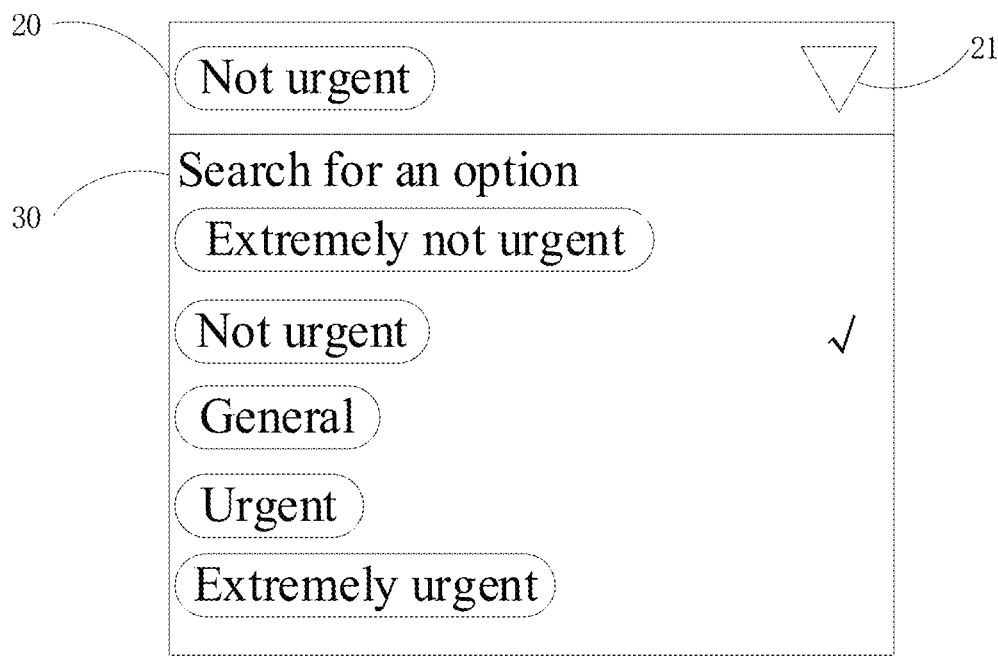
FIG. 3 is a schematic diagram of an option interface according to an embodiment of the present disclosure.

As an example, referring to FIG. 3, the user may open an option interface 30 by triggering a drop-down control 21 displayed in a target cell 20. Option data with different colors (not shown) as background colors (contours of the background colors are shown as rounded rectangles) are displayed in the option interface 30, which are "Extremely not urgent", "Not urgent", "General", "Urgent", and "Extremely urgent", respectively. The user may select one or more items of the option data to fill in the target cell 20, and the option data filling the target cell is still in its background color. As shown in FIG. 3, the user currently selects the option "Not urgent", and the target cell 20 is filled with "Not urgent" in its background color.

In some embodiments, the method 100 further includes the following steps.

Step B1: in response to the user entering one or more of the N items of option data in the target cell, displaying the entered option data in the target cell according to a cell color scheme associated with the entered option data.

In this embodiment, the user may enter the option data in the target cell, and the entered option data is automatically displayed in the target cell according to the associated cell color scheme.

In some embodiments, the M cell color schemes determined in step S170 may be initial cell color schemes or default cell color schemes automatically configured by the system. Alternatively, the user may further customize a cell color scheme. Customizing the cell color scheme by the user may include the following steps:

step C1: displaying a color selection interface used to edit cell color schemes for the N items of option data; and step C2: determining the M cell color schemes based on an operation of the user on the color selection interface.

In some embodiments, the color editing interface may be displayed in response to a second control displayed in the data editing interface being triggered. As an example, referring to FIG. 2, the user may open the color editing interface by triggering a second control 12 displayed in the data editing interface 10.

In some embodiments, the N items of option data are displayed in the color selection interface, and each item of option data corresponds to one color selection identifier. Step C2 further includes the following steps:

step c21: in response to a first color selection identifier corresponding to first option data being triggered, displaying a cell color scheme set interface where a plurality of cell color schemes are displayed, where the first option data is any one of the N items of option data;

step c22: determining a first cell color scheme in response to an operation of the user on the cell color scheme set interface; and step c23: determining the first cell color scheme as a cell color scheme corresponding to the first option data.

In some embodiments, an initial display color of the first color selection identifier corresponds to one of the M cell color schemes; and after the first cell color scheme is determined, a display color of the first color selection identifier corresponds to the first cell color scheme.

Figure 4:
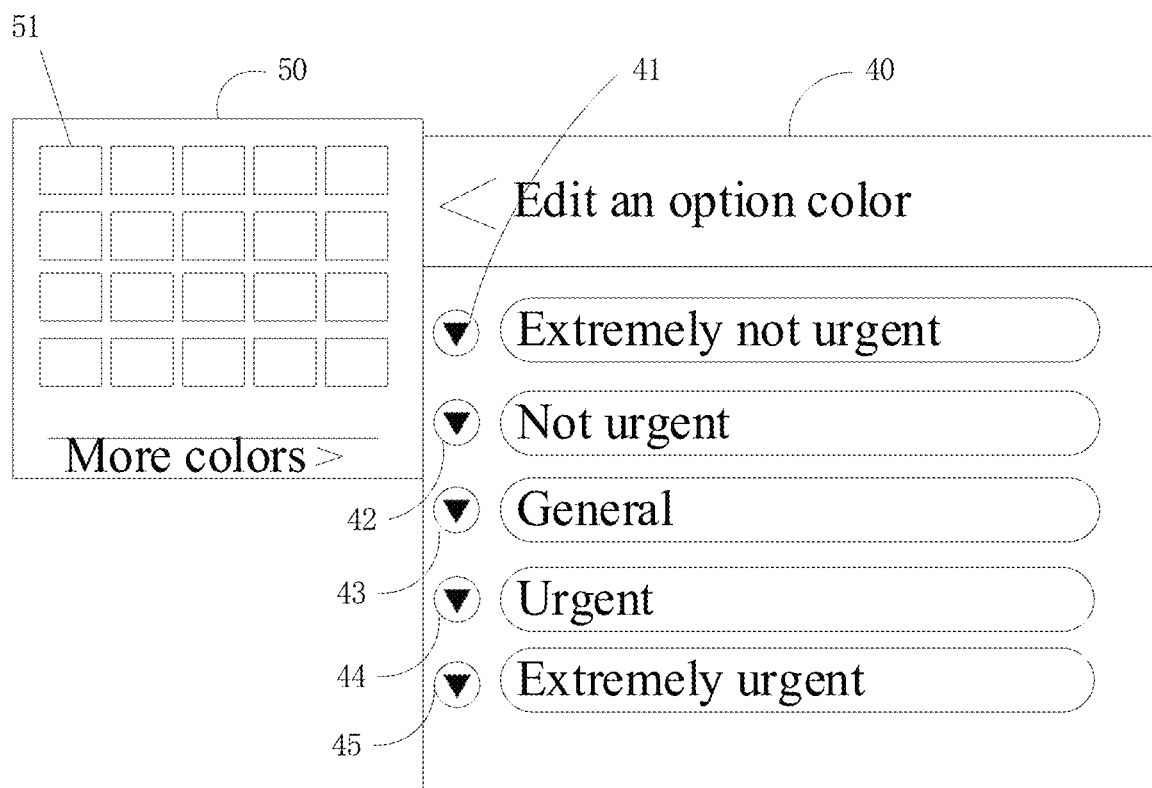
FIG. 4 is a schematic diagram of a color editing interface according to an embodiment of the present disclosure.

Referring to FIG. 4, five items of option data are displayed in a color selection interface 40, which are respectively "Extremely not urgent", "Not urgent", "General", "Urgent", and "Extremely urgent", and color selection identifiers 41, 42, 43, 44, and 45 are correspondingly displayed on the left of the option data, respectively. Initial colors of the color selection identifiers may be in a one-to-one correspondence with default initial cell color schemes configured by the system for the five items of option data, so that the user may know a cell color scheme corresponding to each current item of option data.

Referring to FIG. 4, once the user triggers a first color selection identifier 41, for example, clicks on the first color selection identifier 41 or hovers a cursor over the first color selection identifier, a cell color scheme set interface 50 is displayed. In the cell color scheme set interface 50, a plurality of cell color schemes 51 may be displayed. The user may select one of the cell color schemes as a cell color scheme for the first option data "Extremely not urgent". After the user selects the cell color scheme, a color of the first color selection identifier may change from the initial cell color scheme to a color corresponding to the cell color scheme selected by the user. When the user clicks an OK button or a Back button in the color selection interface 40, a modification made by the user to the cell color scheme is saved.

According to one or more embodiments of the present disclosure, the N items of option data and the color selection identifiers corresponding to the N items of option data are displayed in the color selection interface, where colors of the color selection identifiers correspond to current cell color schemes for the option data, so that the user may globally match and compare the cell color schemes corresponding to the option data.

Based on similar steps, the user may reselect a new cell color scheme for another item of option data, and a color of a color selection identifier corresponding to the another item of option data may accordingly change, which is not described here again.

In some embodiments, if the option data set is referenced from cell data in the spreadsheet, the N items of option data are displayed in the color selection interface according to an arrangement order of the referenced cell data. As an example, if the arrangement order of the referenced cell data is A, B, C, and D, option data A, B, C, and D are displayed in sequence correspondingly in the color selection interface. When the arrangement order of the referenced cell data changes, the option data displayed in the color selection interface changes in sequence.

In some embodiments, if a preset operation is performed on second data in the cell data set, second option data corresponding to the second data is reassociated with a cell color scheme, where the preset operation is used to adjust position order of the second data in the cell data set; and the second data is any item of data in the cell data set.

As an example, if the arrangement order of the referenced cell data is A, B, C, and D, when the user moves, through the drag-and-drop operation, the cell data C to a position between the cell data A and B, the option data C corresponding to the cell data C is reassociated with a cell color scheme, while cell color schemes associated with the other option data (A, B, and D) do not change accordingly.

In some embodiments, if third data is added to the cell data set, third option data corresponding to the third data is added to the option data set, and the third option data is associated with a cell color scheme.

As an example, if a referenced cell data set changes from "A, B, C, and D" to "A, B, C, D, and E", a corresponding option data set changes correspondingly from "A, B, C, and D" to "A, B, C, D, and E", and the newly added option data E is associated with a cell color scheme, while cell color schemes associated with the other option data (A, B, C, and D) do not change accordingly.

In some embodiments, if fourth data is deleted from the cell data set, fourth option data corresponding to the fourth data is deleted from the option data set, and a cell color scheme associated with the fourth option data is deleted, where the fourth data is any item of data in the cell data set.

In some embodiments, when the drag-and-drop operation is performed on a cell in a cell reference range, the number of the cell color schemes corresponding to the N items of option data does not change, that is, the number of the determined M cell color schemes does not change, option data corresponding to the referenced cell on which the drag-and-drop operation is performed is reassociated with a new cell color scheme, and a cell color scheme associated with option data corresponding to a referenced cell on which no drag-and-drop operation is performed remains unchanged.

In some embodiments, when a new cell (for example, a new row or column) is inserted in a cell reference range, or a cell reference range is expanded, new option data is accordingly added, and the newly added option data is associated with a cell color scheme, while a cell color scheme associated with original option data remains unchanged.

In some embodiments, when a new cell (for example, a row or column) is deleted from a cell reference range, or a cell reference range is reduced, corresponding option data is accordingly deleted, and a corresponding cell color scheme is deleted, while a cell color scheme associated with the other option data remains unchanged.

Figure 5:
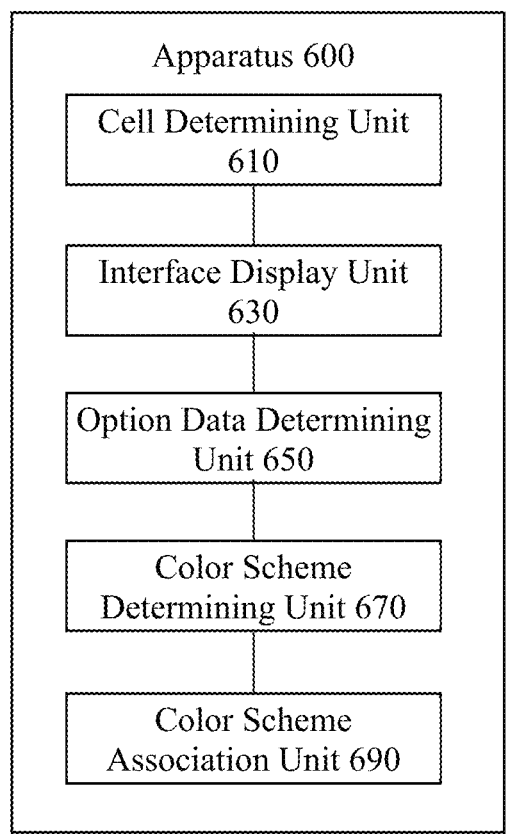
FIG. 5 is a schematic diagram of a structure of a spreadsheet processing apparatus according to another embodiment of the present disclosure.

Accordingly, as shown in FIG. 5, according to an embodiment of the present disclosure, there is provided a spreadsheet processing apparatus 600, including:

a cell determining unit 610 configured to determine a target cell;

an interface display unit 630 configured to display a data editing interface in response to a first operation;

an option data determining unit 650 configured to determine an option data set based on a second operation on the data editing interface, where the option data set includes N items of option data, and N is a positive integer;

a color scheme determining unit 670 configured to determine M cell color schemes based on the N items of option data in response to a first control displayed in the data editing interface being triggered, where M is a positive integer not greater than N; and a color scheme association unit 690 configured to associate the M cell color schemes with the N items of option data, so that each item of option data is capable of being displayed in the target cell according to an associated cell color scheme.

According to one or more embodiments of the present disclosure, the cell color schemes are determined based on the option data in response to the first control displayed in the data editing interface being triggered, and the determined cell color schemes are associated with the option data, such that each item of option data can be displayed in the target cell according to the associated cell color scheme. In this way, a meaning of content of the data is better conveyed through a color, and data discrimination is improved.

In some embodiments, the spreadsheet processing apparatus further includes:

an option interface display unit configured to display an option interface in response to a third operation of a user on the target cell, where in the option interface, the N items of option data are displayed according to the M cell color schemes; and a first target data display unit configured to fill the target cell with target option data in response to the user determining the target option data from the option interface, where the target option data is displayed in the target cell according to the cell color scheme associated with the target option data.

In some embodiments, the spreadsheet processing apparatus further includes:

a second target data display unit configured to: in response to a user entering one or more of the N items of option data in the target cell, display the entered option data in the target cell according to a cell color scheme associated with the entered option data.

In some embodiments, the color scheme determining unit is configured to determine M initial cell color schemes in response to the first control displayed in the data editing interface being triggered. The spreadsheet processing apparatus further includes:
- a color selection interface display unit configured to display a color selection interface used to edit cell color schemes for the N items of option data; and
- a second color scheme determining unit configured to determine the M cell color schemes based on an operation of a user on the color selection interface.

In some embodiments, the spreadsheet processing apparatus further includes:
- a first reassociation unit configured to: if a preset operation is performed on second data in the cell data set, reassociate second option data corresponding to the second data with a cell color scheme, where the preset operation is used to adjust position order of the second data in the cell data set; and the second data is any item of data in the cell data set.

In some embodiments, the spreadsheet processing apparatus further includes:
- a second reassociation unit configured to: if third data is added to the cell data set, add third option data corresponding to the third data to the option data set, and associate the third option data with a cell color scheme.

In some embodiments, the spreadsheet processing apparatus further includes:
- a third reassociation unit configured to: if fourth data is deleted from the cell data set, delete fourth option data corresponding to the fourth data from the option data set, and delete a cell color scheme associated with the fourth option data, where the fourth data is any item of data in the cell data set.

The apparatus embodiment is substantially corresponding to the method embodiment, and therefore for a related part, reference may be made to the part of the descriptions of the method embodiment. The apparatus embodiment described above is only illustrative, and the modules described as separate modules therein may or may not be separate. Some or all of the modules may be selected according to actual needs to achieve the objectives of the solutions of the embodiments, which can be understood and implemented by a person of ordinary skill in the art without involving any inventive effort.

Accordingly, according to one or more embodiments of the present disclosure, there is provided an electronic device, including:
at least one memory and at least one processor.

The memory is configured to store program code. The processor is configured to call the program code stored in the memory, to cause the electronic device to perform the spreadsheet processing method according to the one or more embodiments of the present disclosure.

Accordingly, according to one or more embodiments of the present disclosure, there is provided a non-transitory computer storage medium, where the non-transitory computer storage medium stores program code that may be executed by a computer device, to cause the computer device to perform the spreadsheet processing method according to the one or more embodiments of the present disclosure.

Figure 6:
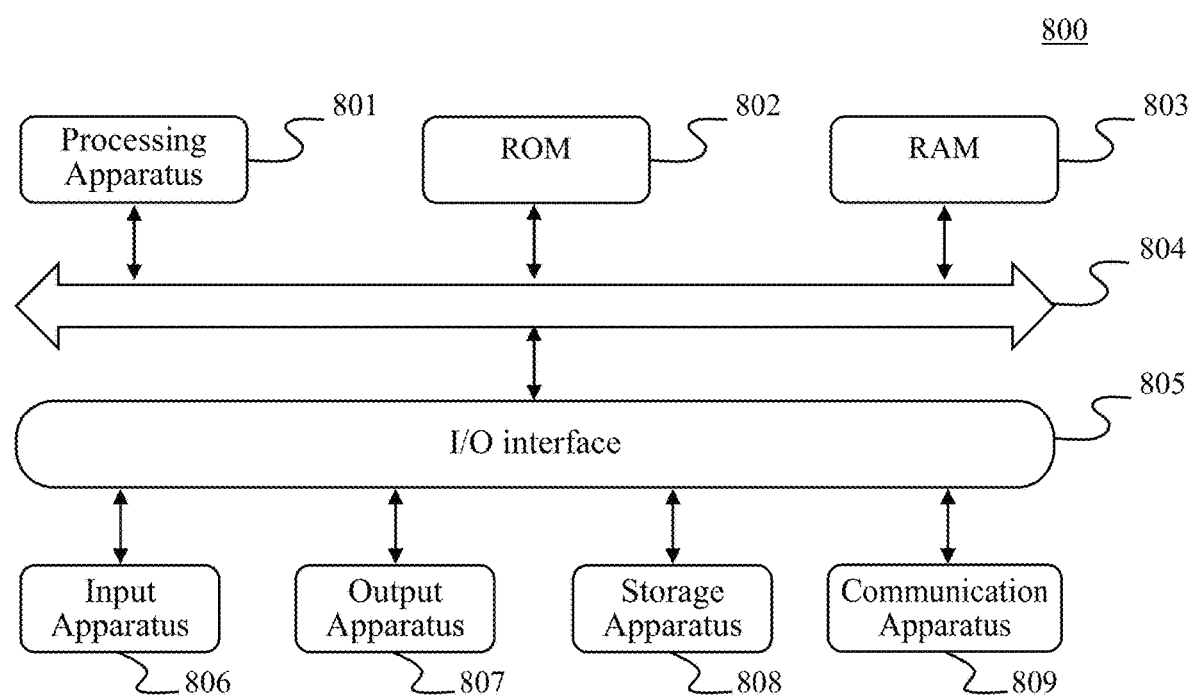
FIG. 6 is a schematic diagram of a structure of an electronic device according to an embodiment of the present disclosure.

FIG. 6 is a schematic diagram of a structure of an electronic device (for example, a terminal device or a server) 800 suitable for implementing the embodiments of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 6 is merely an example, and shall not impose any limitation on the function and scope of use of the embodiments of the present disclosure.

As shown in FIG. 6, the electronic device 800 may include a processing apparatus (e.g., a central processing unit, a graphics processing unit, etc.) 801 that may perform a variety of appropriate actions and processing in accordance with a program stored in a read-only memory (ROM) 802 or a program loaded from a storage apparatus 808 into a random-access memory (RAM) 803. The RAM 803 further stores various programs and data required for operations of the electronic device 800. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 including, for example, a touch screen, a touchpad, a keyboard, a mouse, a camera, a microphone, an accelerometer, and a gyroscope; an output apparatus 807 including, for example, a liquid crystal display (LCD), a speaker, and a vibrator; a storage apparatus 808 including, for example, a tape and a hard disk; and a communication apparatus 809. The communication apparatus 809 may allow the electronic device 800 to perform wireless or wired communication with other devices to exchange data. Although FIG. 6 shows the electronic device 800 having various apparatuses, it should be understood that it is not required to implement or have all of the shown apparatuses. It may be an alternative to implement or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a computer-readable medium, where the computer program includes program code for performing the method shown in the flowchart. In such an embodiment, the computer program may be downloaded from a network through the communication apparatus 809 and installed, installed from the storage apparatus 808, or installed from the ROM 802. When the computer program is executed by the processing apparatus 801, the above-mentioned functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server can communicate using any currently known or future-developed network protocol such as a Hypertext Transfer Protocol (HTTP), and can be connected to digital data communication (for example, communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs, and the one or more programs, when executed by the electronic device, cause the electronic device to perform the above method according to the present disclosure.

The computer program code for performing the operations in the present disclosure may be written in one or more programming languages or a combination thereof, where the programming languages include an object-oriented programming language, such as Java, Smalltalk, or C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving a remote computer, the remote computer may be connected to a computer of a user over any type of network, including a local area network (LAN) or a wide area network (WAN), or may be connected to an external computer (for example, connected over the Internet using an Internet service provider).

The flowcharts and block diagrams in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. The name of a unit does not constitute a limitation on the unit itself under certain circumstances.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on a chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

According to one or more embodiments of the present disclosure, there is provided a spreadsheet processing method, including: determining a target cell; displaying a data editing interface in response to a first operation; determining an option data set based on a second operation on the data editing interface, where the option data set includes N items of option data, and N is a positive integer; determining M cell color schemes based on the N items of option data in response to a first control displayed in the data editing interface being triggered, where M is a positive integer not greater than N; and associating the M cell color schemes with the N items of option data, so that each item of option data is capable of being displayed in the target cell according to an associated cell color scheme.

The spreadsheet processing method according to one or more embodiments of the present disclosure further includes: displaying an option interface in response to a third operation of a user on the target cell, where in the option interface, the N items of option data are displayed according to the M cell color schemes; and filling the target cell with target option data in response to the user determining the target option data from the option interface, where the target option data is displayed in the target cell according to a cell color scheme associated with the target option data.

The spreadsheet processing method according to one or more embodiments of the present disclosure further includes: in response to a user entering one or more of the N items of option data in the target cell, displaying the entered option data in the target cell according to a cell color scheme associated with the entered option data.

According to one or more embodiments of the present disclosure, the cell color scheme includes a setting on a background color of a cell and/or a setting on a font color of the cell.

According to one or more embodiments of the present disclosure, the determining M cell color schemes based on the N items of option data in response to a first control displayed in the data editing interface being triggered includes: determining M initial cell color schemes in response to the first control displayed in the data editing interface being triggered. The method further includes: displaying a color selection interface used to edit cell color schemes for the N items of option data; and determining the M cell color schemes based on an operation of a user on the color selection interface.

According to one or more embodiments of the present disclosure, the displaying a color selection interface includes: displaying the color selection interface in response to a second control displayed in the data editing interface being triggered.

According to one or more embodiments of the present disclosure, the N items of option data are displayed in the color selection interface, and each item of option data corresponds to one color selection identifier. The determining the M cell color schemes based on an operation of a user on the color selection interface includes: in response to a first color selection identifier corresponding to first option data being triggered, displaying a cell color scheme set interface where a plurality of cell color schemes are displayed; determining a first cell color scheme in response to an operation of the user on the cell color scheme set interface; and determining the first cell color scheme as a cell color scheme corresponding to the first option data, where the first option data is any one of the N items of option data.

According to one or more embodiments of the present disclosure, an initial display color of the first color selection identifier corresponds to one of the M initial cell color schemes; and after the first cell color scheme is determined, a display color of the first color selection identifier corresponds to the first cell color scheme.

According to one or more embodiments of the present disclosure, N is equal to M, and each item of option data corresponds to one cell color scheme.

According to one or more embodiments of the present disclosure, the determining M cell color schemes includes: determining the M cell color schemes from a preset cell color scheme set according to a preset sequence.

According to one or more embodiments of the present disclosure, the determining an option data set based on a second operation on the data editing interface includes: in response to a select operation on at least one cell in a spreadsheet, referencing a cell data set corresponding to the at least one cell as the option data set.

According to one or more embodiments of the present disclosure, that the N items of option data are displayed in the color selection interface includes: if the option data set is referenced from cell data in a spreadsheet, the N items of option data are displayed in the color selection interface according to an arrangement order of the referenced cell data.

The spreadsheet processing method according to one or more embodiments of the present disclosure further includes: if a preset operation is performed on second data in the cell data set, reassociating second option data corresponding to the second data with a cell color scheme, where the preset operation is used to adjust position order of the second data in the cell data set; and the second data is any item of data in the cell data set.

According to one or more embodiments of the present disclosure, the preset operation is a drag-and-drop operation.

The spreadsheet processing method according to one or more embodiments of the present disclosure further includes: if third data is added to the cell data set, adding third option data corresponding to the third data to the option data set, and associating the third option data with a cell color scheme.

The spreadsheet processing method according to one or more embodiments of the present disclosure further includes: if fourth data is deleted from the cell data set, deleting fourth option data corresponding to the fourth data from the option data set, and deleting a cell color scheme associated with the fourth option data, where the fourth data is any item of data in the cell data set.

According to one or more embodiments of the present disclosure, there is provided a spreadsheet processing apparatus, including: a cell determining unit configured to determine a target cell; an interface display unit configured to display a data editing interface in response to a first operation; an option data determining unit configured to determine an option data set based on a second operation on the data editing interface, where the option data set includes N items of option data, and N is a positive integer; a color scheme determining unit configured to determine M cell color schemes based on the N items of option data in response to a first control displayed in the data editing interface being triggered, where M is a positive integer not greater than N; and a color scheme association unit configured to associate the M cell color schemes with the N items of option data, so that each item of option data is capable of being displayed in the target cell according to an associated cell color scheme.

According to one or more embodiments of the present disclosure, there is provided an electronic device, including: at least one memory and at least one processor, where the memory is configured to store program code, and the processor is configured to call the program code stored in the memory, to cause the electronic device to perform any one of the spreadsheet processing methods according to one or more embodiments of the present disclosure.

According to one or more embodiments of the present disclosure, there is provided a non-transitory computer storage medium, where the non-transitory computer storage medium stores program code that, when executed by a computer device, causes the computer device to perform any one of the spreadsheet processing methods according to one or more embodiments of the present disclosure.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should be understood as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A spreadsheet processing method, comprising:
   determining a target cell;
   displaying a data editing interface in response to a first operation, wherein the data editing interface comprises a first control;
   determining an option data set based on a second operation on the data editing interface, wherein the option data set comprises N items of option data, and N is a positive integer, and wherein the N items of option data comprise N cell values selectable to fill the target cell;
   automatically determining and configuring M cell color schemes without user input based on the N items of option data in response to the first control displayed in the data editing interface being triggered, wherein M is a positive integer not greater than N;
   associating the M cell color schemes with the N items of option data, so that each item of option data is capable of being displayed in the target cell according to an associated cell color scheme;
   displaying an option interface in response to a third operation on the target cell, wherein in the option interface, the N cell values selectable to fill the target cell are displayed according to the M cell color schemes; and
   filling the target cell with a cell value in response to selecting the cell value from the N cell values displayed via the option interface, wherein the cell value is displayed in the target cell according to a cell color scheme associated with the cell value.

2. The spreadsheet processing method according to claim 1, further comprising:
   in response to a user entering one or more of the N items of option data in the target cell, displaying the entered option data in the target cell according to a cell color scheme associated with the entered option data.

3. The spreadsheet processing method according to claim 1, wherein
   the cell color scheme comprises a setting on a background color of a cell and/or a setting on a font color of the cell.

4. The spreadsheet processing method according to claim 1, wherein
   the determining M cell color schemes based on the N items of option data in response to a first control displayed in the data editing interface being triggered comprises: determining M initial cell color schemes in response to the first control displayed in the data editing interface being triggered; and
   the method further comprises:
   displaying a color selection interface used to edit cell color schemes for the N items of option data; and
   determining the M cell color schemes based on an operation of a user on the color selection interface.

5. The spreadsheet processing method according to claim 4, wherein the displaying a color selection interface comprises:
   displaying the color selection interface in response to a second control displayed in the data editing interface being triggered.

6. The spreadsheet processing method according to claim 4, wherein
   the N items of option data are displayed in the color selection interface, and each item of option data corresponds to one color selection identifier; and
   the determining the M cell color schemes based on an operation of a user on the color selection interface comprises:
   in response to a first color selection identifier corresponding to first option data being triggered, displaying a cell color scheme set interface where a plurality of cell color schemes are displayed;
   determining a first cell color scheme in response to an operation of the user on the cell color scheme set interface; and
   determining the first cell color scheme as a cell color scheme corresponding to the first option data,
   wherein the first option data is any one of the N items of option data.

7. The spreadsheet processing method according to claim 6, wherein
   an initial display color of the first color selection identifier corresponds to one of the M initial cell color schemes; and
   after the first cell color scheme is determined, a display color of the first color selection identifier corresponds to the first cell color scheme.

8. The spreadsheet processing method according to claim 1, wherein
   N is equal to M, and each item of option data corresponds to one cell color scheme.

9. The spreadsheet processing method according to claim 1, wherein the determining M cell color schemes comprises:
   determining the M cell color schemes from a preset cell color scheme set according to a preset sequence.

10. The spreadsheet processing method according to claim 1, wherein the determining an option data set based on a second operation on the data editing interface comprises:
    in response to a select operation on at least one cell in a spreadsheet, referencing a cell data set corresponding to the at least one cell as the option data set.

11. The spreadsheet processing method according to claim 6, wherein that the N items of option data are displayed in the color selection interface comprises:
    if the option data set is referenced from cell data in a spreadsheet, the N items of option data are displayed in the color selection interface according to an arrangement order of the referenced cell data.

12. The spreadsheet processing method according to claim 10, further comprising:
- if a preset operation is performed on second data in the cell data set, reassociating second option data corresponding to the second data with a cell color scheme,
- wherein the preset operation is used to adjust a position order of the second data in the cell data set; and the second data is any item of data in the cell data set.

13. The spreadsheet processing method according to claim 12, wherein
the preset operation is a drag-and-drop operation.

14. The spreadsheet processing method according to claim 10, further comprising:
- if third data is added to the cell data set, adding third option data corresponding to the third data to the option data set, and associating the third option data with a cell color scheme.

15. The spreadsheet processing method according to claim 10, further comprising:
- if fourth data is deleted from the cell data set, deleting fourth option data corresponding to the fourth data from the option data set, and deleting a cell color scheme associated with the fourth option data, wherein the fourth data is any item of data in the cell data set.

16. An electronic device, comprising:
- at least one memory and at least one processor, wherein the memory is configured to store program code, the processor is configured to call the program code stored in the memory, to cause the electronic device to perform operations, and the operations comprise:
- determining a target cell;
- displaying a data editing interface in response to a first operation, wherein the data editing interface comprises a first control;
- determining an option data set based on a second operation on the data editing interface, wherein the option data set comprises N items of option data, and N is a positive integer, and wherein the N items of option data comprise N cell values selectable to fill the target cell;
- automatically determining and configuring M cell color schemes without user input based on the N items of option data in response to the first control displayed in the data editing interface being triggered, wherein M is a positive integer not greater than N;
- associating the M cell color schemes with the N items of option data, so that each item of option data is capable of being displayed in the target cell according to an associated cell color scheme;
- displaying an option interface in response to a third operation on the target cell, wherein in the option interface, the N cell values selectable to fill the target cell are displayed according to the M cell color schemes; and
- filling the target cell with a cell value in response to selecting the cell value from the N cell values displayed via the option interface, wherein the cell value is displayed in the target cell according to a cell color scheme associated with the cell value.

17. A non-transitory computer storage medium, wherein the non-transitory computer storage medium stores program code that, when executed by a computer device, causes the computer device to perform operations comprising:
- determining a target cell;
- displaying a data editing interface in response to a first operation, wherein the data editing interface comprises a first control;
- determining an option data set based on a second operation on the data editing interface, wherein the option data set comprises N items of option data, and N is a positive integer, and wherein the N items of option data comprise N cell values selectable to fill the target cell;
- automatically determining and configuring M cell color schemes without user input based on the N items of option data in response to the first control displayed in the data editing interface being triggered, wherein M is a positive integer not greater than N;
- associating the M cell color schemes with the N items of option data, so that each item of option data is capable of being displayed in the target cell according to an associated cell color scheme;
- displaying an option interface in response to a third operation on the target cell, wherein in the option interface, the N cell values selectable to fill the target cell are displayed according to the M cell color schemes; and
- filling the target cell with a cell value in response to selecting the cell value from the N cell values displayed via the option interface, wherein the cell value is displayed in the target cell according to a cell color scheme associated with the cell value.

* * * * *